(12) United States Patent
Johnson et al.

(10) Patent No.: US 8,517,346 B2
(45) Date of Patent: Aug. 27, 2013

(54) APPARATUS FOR STOWING A SPARE TIRE

(75) Inventors: David Johnson, Farmington Hills, MI (US); Shiro Kugo, West Bloomfield, MI (US)

(73) Assignee: Nissan North America, Inc., Franklin, TN (US)

( * ) Notice: Subject to any disclaimer, the term of this patent is extended or adjusted under 35 U.S.C. 154(b) by 305 days.

(21) Appl. No.: 12/987,952

(22) Filed: Jan. 10, 2011

(65) Prior Publication Data
US 2012/0175907 A1    Jul. 12, 2012

(51) Int. Cl.
*B66D 1/00*    (2006.01)

(52) U.S. Cl.
USPC ............... 254/323; 224/42.12; 224/42.23; 224/42.24; 224/42.25

(58) Field of Classification Search
USPC ............ 254/323; 224/42.12, 42.13, 42.14, 224/42.2, 42.21–42.25, 42.26
See application file for complete search history.

(56) References Cited

U.S. PATENT DOCUMENTS

| | | | | |
|---|---|---|---|---|
| 2,400,274 A | * | 5/1946 | Ullman | ............ 414/463 |
| 3,856,167 A | * | 12/1974 | Yasue et al. | ............ 414/463 |
| 3,865,264 A | * | 2/1975 | Kuhns | ............ 414/463 |
| 4,492,506 A | * | 1/1985 | Hoagland et al. | ............ 414/463 |
| 4,516,706 A | | 5/1985 | Niehaus | |
| 4,548,540 A | * | 10/1985 | Renfro | ............ 414/463 |
| 5,513,788 A | * | 5/1996 | Cochrane et al. | ............ 224/42.23 |
| 5,823,413 A | | 10/1998 | Seitz | |
| 6,026,999 A | * | 2/2000 | Wakefield | ............ 224/42.12 |
| 6,116,415 A | | 9/2000 | Rastelli | |
| 6,941,802 B2 | | 9/2005 | Brown | |
| 7,770,764 B2 | | 8/2010 | Rock et al. | |

FOREIGN PATENT DOCUMENTS

JP    1998071971    3/1998

OTHER PUBLICATIONS

Specimen of Cover in Public Use to Jan. 10, 2011.

* cited by examiner

*Primary Examiner* — Emmanuel M Marcelo
*Assistant Examiner* — Angela Caligiuri
(74) *Attorney, Agent, or Firm* — Young, Basile, Hanlon & MacFarlane, P.C.

(57) ABSTRACT

An apparatus for storing a spare tire is disclosed herein. The apparatus includes a hoisting device mountable to the underside of a vehicle. A tether is provided having a first portion and a second portion coupled to the hoisting device so that the first and second portions of the tether depend from the hosting device when it is mounted to the underside of a vehicle. A coupling member attached to the first portion of the tether permits an operator to attach the tether to the tire. A removable guard lays over at least part of the hub-facing wheel portion to cover one or more of the plurality of lug apertures such that the second portion of the tether cannot enter the plurality of lug apertures when the hosting device raises the spare tire.

18 Claims, 7 Drawing Sheets

APPARATUS FOR STOWING A SPARE TIRE

FIELD OF THE INVENTION

The present invention relates to the field of spare tires for motor vehicles generally and in particular to devices for stowing spare tires underneath a portion of a vehicle.

BACKGROUND

Many vehicles include a spare wheel-mounted tire stored in a trunk or adjacent to an exterior portion. In some cases, the spare tire can be stowed near the underside of the vehicle. A hoisting device may be provided to assist in raising and lowering the spare tire to and from its stowage position. Such a hoisting device can include a winch that winds or unwinds a cable, chain, strap or other connecting member that is releasably coupled to the spare tire. Thus, in a stowage mode, an operator can couple the connecting member to the spare tire and actuate the hoisting device to lift the spare tire to the stowage position on or near the underside of the vehicle. In a removing mode, the operator can actuate the hoisting device to lower the spare tire to the ground, and can then decouple the connecting member from the tire so that the tire can be deployed on the vehicle.

SUMMARY

Embodiments of an apparatus for storing a spare tire are disclosed herein. One embodiment is an apparatus for stowing a spare tire having a hub-facing wheel portion with a plurality of lug apertures. The apparatus includes a hoisting device mountable to the underside of a vehicle. A tether is provided having a first portion and a second portion coupled to the hoisting device so that the first and second portions of the tether depend from the hoisting device when it is mounted to the underside of a vehicle. A coupling member is attached to the first portion of the tether and configured to releasably attach the tether to the hub-facing wheel portion of the spare tire when the spare tire is substantially horizontal. A removable guard is sized and configured to lay over at least part of the hub-facing wheel portion to at least partially cover at least one or more of the plurality of lug apertures such that the second portion of the tether cannot enter the at least one or more of the plurality of lug apertures when the hoisting device raises the spare tire.

In another embodiment, a spare tire stowage assembly is provided for use in a vehicle. The assembly includes a spare tire having a hub-facing wheel portion with a plurality of lug apertures. A hoisting device is provided that is mountable to the underside of the vehicle. A tether has a first portion and a second portion coupled to the hoisting device so that the first and second portions of the tether depend from the hoisting device. A coupling member is attached to the first portion of the tether and configured to releasably attach the tether to the hub- facing wheel portion of the spare tire when the spare tire is substantially horizontal. A removable guard that-is sized and configured to lay over at least part of the hub-facing wheel portion to at least partially cover the one or more of the plurality of lug apertures.

In another embodiment, a method for stowing a spare tire having a hub-facing wheel portion with a plurality of lug apertures using a winch and tether that is mounted beneath a vehicle. The method includes the steps of providing a removable guard that is sized and configured to lay over at least part of the hub-facing wheel portion to at least partially cover at least one of the plurality of lug apertures, the removable guard including a central aperture. The first end of the tether is inserted through the central aperture of the removable guard. The first end of the tether is then coupled to the hub-facing wheel portion. The removable guard is placed over at least part of the hub-facing wheel portion. The spare tire is hoisted up into a stowage position using the winch.

BRIEF DESCRIPTION OF THE DRAWINGS

The description herein makes reference to the accompanying drawings wherein like reference numerals refer to like parts throughout the several views, and wherein.

DETAILED DESCRIPTION

Embodiments of an apparatus for stowing a spare tire are described with respect to FIGS. 1-12.

Figure 1:
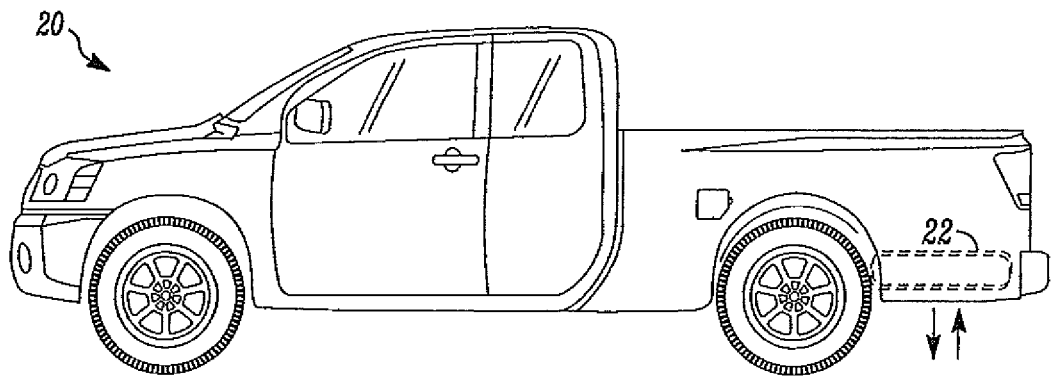
FIG. 1 is a side elevation of a vehicle equipped with spare tire mounted to the underside of the vehicle.
Figure 2:
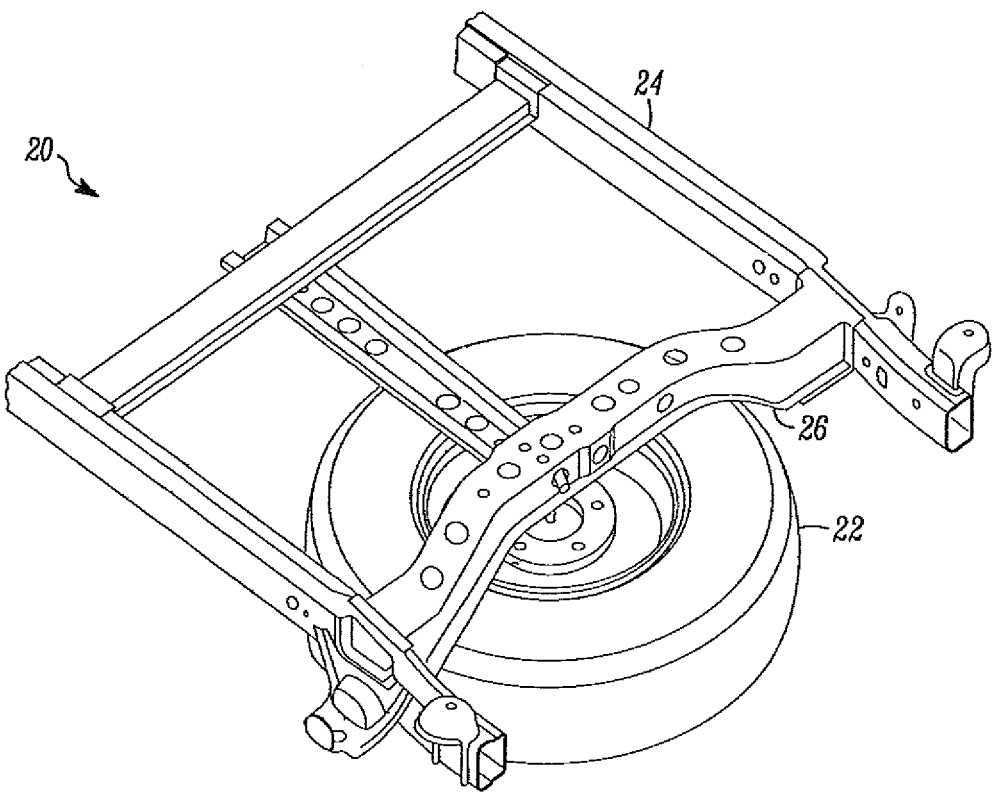
FIG. 2 is a perspective view of a portion of the vehicle of FIG. 1 including the spare tire.

FIG. 1 is a side elevation of a vehicle 20 equipped with a spare tire 22 mounted to the underside of the vehicle. As depicted by the arrows of FIG. 1, spare tire 22 can be raised and lowered using a hoisting device into and out of its stowed position. FIG. 2 is a perspective view of a portion of the underside of the vehicle 20 of FIG. 1, showing in more detail the configuration of the vehicle 20 and spare tire 22 when spare tire 22 is in its stowed position. Vehicle 20 includes frame elements 24 that define a recess 26. Spare tire 22 is hoisted up into recess 26 so that it is tucked securely under the vehicle with adequate ground clearance when in its stowed position.

Figure 3:
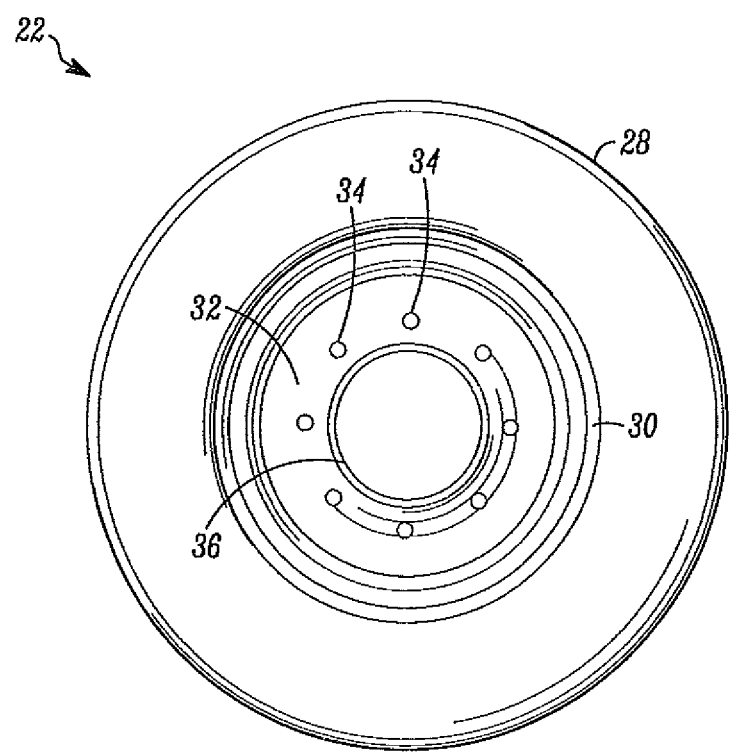
FIG. 3 is a top plan view of the spare tire shown in FIG. 1.

FIG. 3 is a top plan view of the spare tire 22 shown in FIG. 1. Spare tire 22 includes an inflated tire portion 28 mounted to a wheel 30. Wheel 30 includes a hub-facing central portion 32 configured to engage a wheel hub on the axle of vehicle 20 and a plurality of apertures, referred to generally as lug apertures 34, that are sized and configured to receive wheel studs (not shown) projecting from the wheel hub. When spare tire 22 is mounted to vehicle 20 for operational use, central surface portion 32 will face toward the interior of vehicle 20 and will not be visible to persons looking at the exterior of vehicle 20. Central portion 32 includes a central wheel aperture 36 that is sized and configured to receive a portion of the wheel hub. Central portion 32 can also receive a projection (not shown) mounted to vehicle frame 24 to help secure spare tire 22 when in its stowed position within recess 26. As is conventional, lug apertures 34 are circumferentially arranged about central wheel aperture 36.

Figure 4:
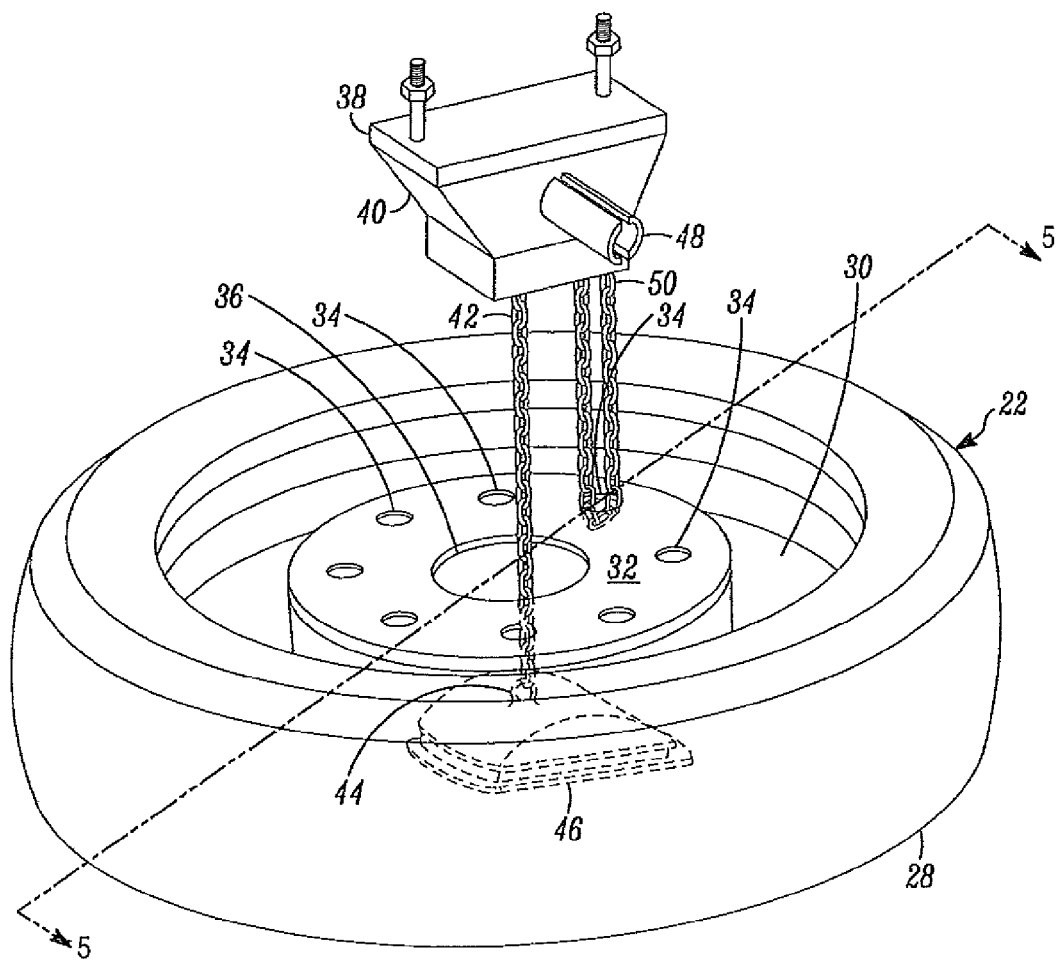
FIG. 4 is an enlarged, partial perspective view of the spare tire of FIG. 1 and a hoisting device, including a winch and chain, that is used to lift the spare tire toward the underside of the vehicle.

FIG. 4 is an enlarged, partial perspective view of the spare tire of FIG. 1 and a hoisting device 38 including a winch 40 and a tether in the form of chain 42 that is used to lift spare tire 22 toward the underside of the vehicle 20. One end 44 of chain 42 terminates at coupling member 46. The other end of chain (not shown) is secured to hoisting device 38 or directly to frame 24. Coupling member 46 is configured to releasably attach the chain 42 to the hub-facing wheel portion 32 of spare tire 22 when the spare tire 22 is substantially horizontal. For example, in this case coupling member 46 is an enlarged base that has a lateral dimension smaller than the diameter of central wheel aperture 36 and a longitudinal dimension that is larger than the diameter of central wheel aperture 36. Coupling member 46 can be inserted longitudinally into central wheel aperture 36 and then reoriented so that its longitudinal extent is perpendicular to the axis of central wheel aperture 36, thus preventing coupling member 46 from passing back through central wheel aperture 36.

Chain 42 is threaded through winch 40. Winch 40 is fixed to vehicle 20 such as by frame 24 (not shown in FIG. 4). Alternatively, winch 40 could be placed at another location of vehicle 20, such as on the roof of an interior cargo area, to haul spare tire 22 up to a stowage area other than beneath vehicle 20. Winch 40 includes a ratable element 48 mounted for rotation about its longitudinal axis. Ratable element 48 can be actuated either manually such as by use of a removable handle or crank or through a motor. When notable element 48 is rotated in a first direction, gears within winch 40 engage chain 42 to pull chain 42 toward the winch 38, thus raising coupling member 46 and spare tire 22. When ratable element 48 is rotated in a direction opposite to the first direction, cable 42 is paid out, thus lowering coupling member 46 and spare tire 22.

It should be noted that chain 42 can be replaced with other suitable tethers such as lines, cables or cords. Also hoisting device 38 is mountable to the underside of the vehicle in the sense that it is mounted to the vehicle so that chain 42 extends down below the vehicle to the ground. The term "underside" is not intended to be limited to any particular part of the frame or the chassis, nor does it mean that hoisting device be the lowest point on the vehicle. For example, hoisting device 38 could be mounted on or above the vehicle frame and extend chain 40 down below the vehicle toward the ground. Such a configuration, for example, would be understood herein as mounted to the underside of the vehicle.

As chain 42 is pulled up by winch 40, an intermediate portion 50 of chain 42 is paid out between the internal gearing of winch 40 and the end of chain fixed to hoisting device 38 or frame 24. Intermediate portion 50 of chain 42 hangs loosely from beneath winch 40 and grows longer as spare tire 22 is hoisted upward. Eventually, as spare tire 22 rises and intermediate portion 50 grows, central portion 32 of spare tire 22 engages intermediate portion 50, providing an opportunity for links such as links 52 of intermediate portion 50 to pass through one or more apertures 34, as most clearly seen in FIG. 5.

Figure 5:
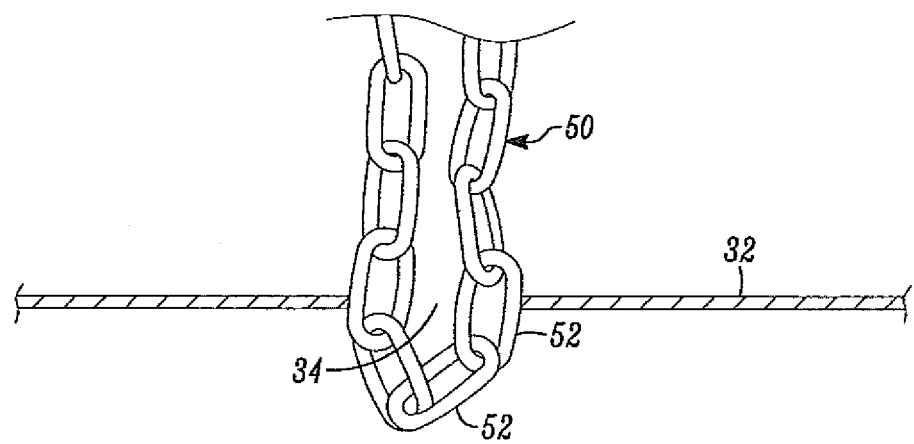
FIG. 5 is an enlarged sectional view of a portion of the spare tire shown in FIG. 1 showing a portion of the chain of the hoisting device trapped in a lug aperture.

FIG. 5 is an enlarged sectional view of a portion of the spare tire shown in FIG. 4, taken along the lines 5-5. FIG. 5 shows the several links 52 of the intermediate portion 50 of chain 52 extending through one of apertures 34. Links 52 can kink up beneath central portion 32. Thereafter, if the spare tire 22 is required to be removed from its storage position, winch 40 will attempt to pay out 42 cable; however, links 52 will jam beneath one of apertures 34, seizing the operation of hoisting device 38. The driver in such circumstance may be unable to remove spare tire 22 from its stowage position underneath vehicle 20.

Figure 6:
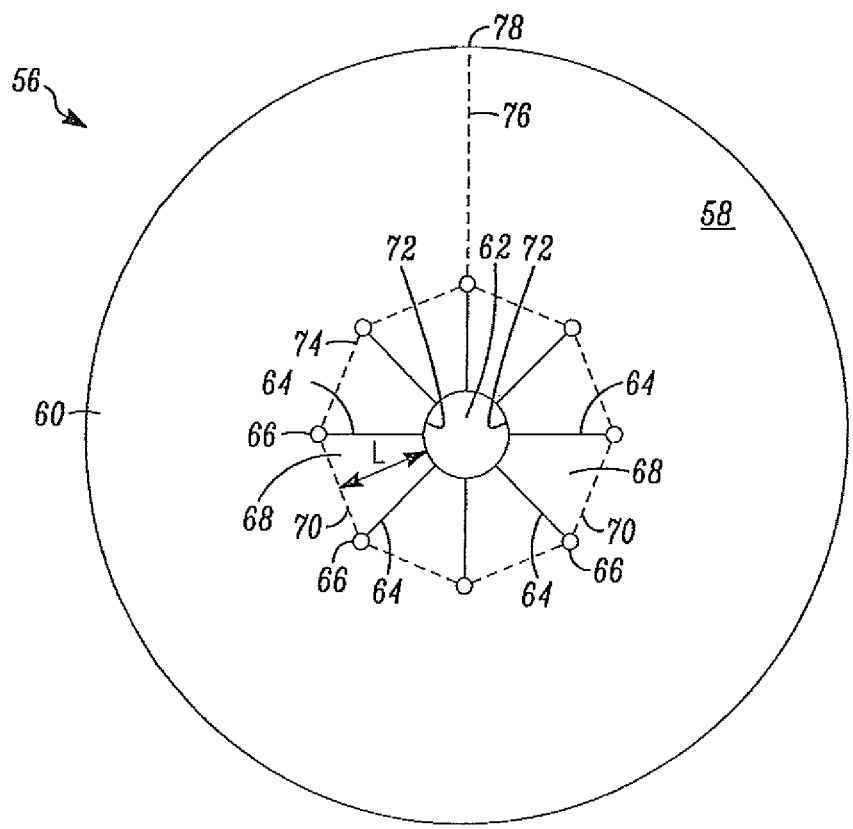
FIG. 6 is a top plan view of a guard for use with the spare tire of FIGS. 1-5.

Referring to FIG. 6, top plan view of a guard 56 is shown for use with the spare tire 22 of FIGS. 1-5. As described below, guard 56 is intended to be placed over central portion 32 of wheel 30. Guard 56 is generally circular in configuration defining a planar surface 58. Guard 56 is made of a flat-laying pliable material such as rubber, plastic, coated paper or leather. Guard can be other shapes (such as rectilinear or ovular) and need not be planar or flat-laying but can have molded therein a contour to its surface. Guard 56 is between about seven and about twelve inches in diameter, although larger guards can be used to provide coverage of both the central portion 32 of wheel as well as inflatable tire portion 28.

In this case, guard 56 includes an outer generally ring-shaped portion 60 sized to fit over at least part of central portion 32 of wheel 30, including lug apertures 36. Ring portion 60 surrounds and defines a central aperture 62. A plurality of slits such as slits 64 project radially from central aperture 62, terminating in a small aperture such as aperture 66. The slits 64 define therebetween movable flaps such as flaps 68. Each of flaps 68 has a base such as base 70 and terminates in an arcuate distal end 72. When the flaps 68 lay flat in coplanar relation to the to the planar surface 58, their arcuate distal ends 72 define the circular central aperture 62 at between about one half inches and two inches in diameter. To avoid cluttering the drawings, reference numbers are shown only for representative flaps and slits.

Figure 7:
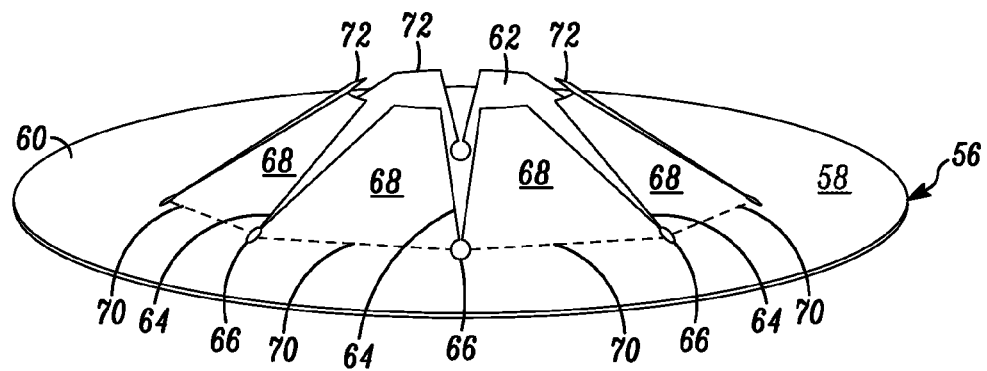
FIG. 7 is a perspective view of the guard of FIG. 6.

FIG. 7 is a perspective view of the guard of FIG. 6. As mentioned, guard 56 is pliable so that it can be flexed, causing flaps 68 to project outward and effectively increasing the size and shape of central aperture 62. In effect, the bases 70 circumscribe a generally circular opening of about four inches in diameter whose circumference is indicated in FIGS. 6 and 7 by a dotted line 74. Thus, upon the movement of one or more of flaps 68 from their flat position (FIG. 6) to a flexed or projecting position (FIG. 7), the size of the central aperture 62 is effectively expanded up to four inches in diameter. As explained below, this expansion permits coupling member 46 to pass through central aperture 62.

Put another way, the largest extent of central aperture 62 is defined by the bases 70 of the flaps 68 (as indicated by dotted line 74 in FIGS. 6 and 7). Flaps 68 are arranged about the circumference of the largest extent of central aperture 62. Each flap 68 has a length such as length L (See FIG. 6) that is less than the radius of the largest extent of central aperture 62 so that when flaps 68 lay flat relative to the outer portion 60 they obstruct in part central aperture 62, making the effective size of central aperture 62 smaller (that is, the size of circle defined by the distal end actuate distal ends 72 of flaps 68).

Other configurations of slits and flaps are possible. For example, an optional single slit (see dotted line 76 in FIG. 6) can extend from central aperture 62 to the periphery 78 of guard 56. This single slit would permit guard 56 to be placed around chain 42 even if central aperture 62 were too small to accommodate coupling member 46. If it were used, it would be possible to omit the other slits 68. Alternatively, in lieu of slits, guard 56 can be made of an elastic material to permit expansion of the diameter of central aperture 62 to accommodate passage of coupling member 46.

Figure 8:
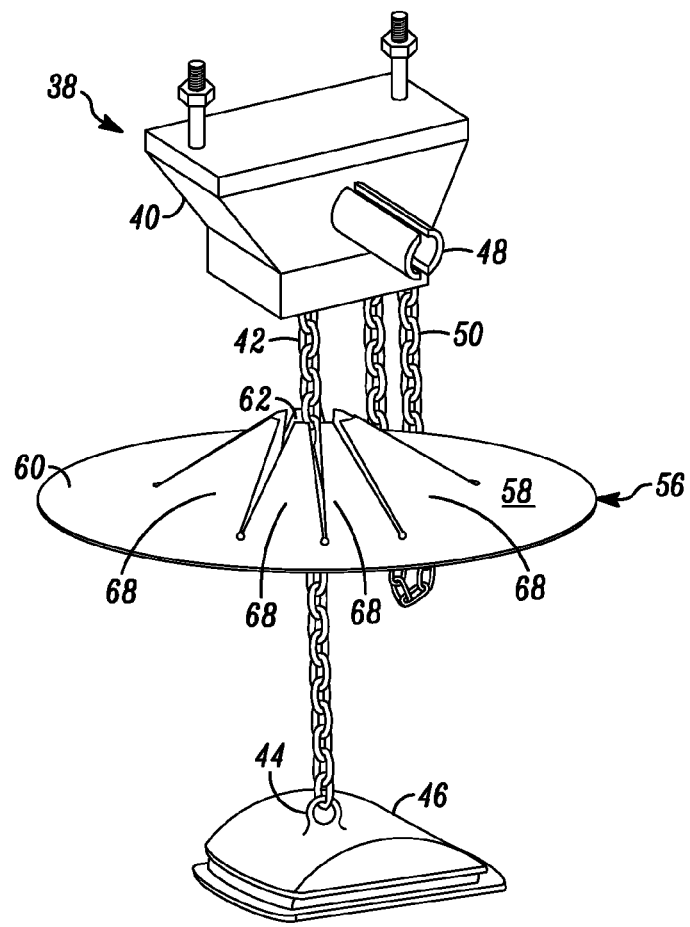
FIG. 8 is a perspective view of a spare tire assembly including the hoisting device and guard.

FIG. 8 is a perspective view of hoisting device 38 showing protective guard 56 installed thereon (without the spare tire). Central aperture 62 of guard 56 is expanded by flexing flaps 68, permitting an operator to pass chain 42 and connecting member 46 through central aperture 62 of guard 56. When guard 56 is in a flat configuration as shown in FIG. 6, central aperture 62 of guard 56 is too small to accommodate coupling member 46 but is of sufficient diameter to accommodate chain 42, as shown in FIG. 9.

Figure 9:
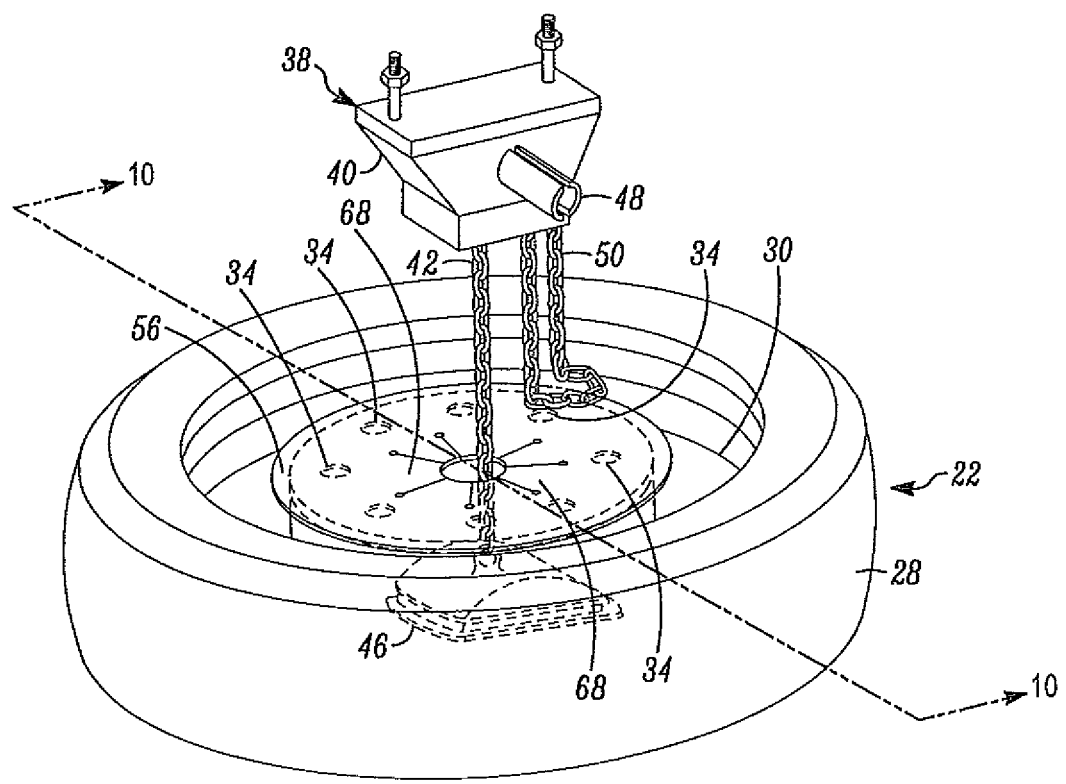
FIG. 9 is a perspective view of the spare tire assembly of FIG. 8 including the spare tire.
Figure 10:
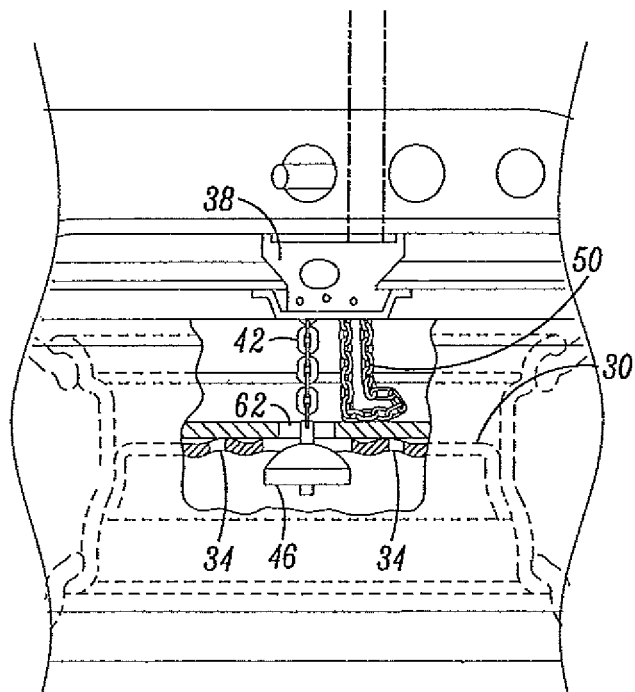
FIG. 10 is a sectional view of the spare tire assembly of FIG. 9 taken along the lines 10-10.

FIG. 9 is a perspective view of a spare tire assembly including hoisting device 38, protective guard 56 and the spare tire 22. FIG. 10 is a sectional view of the spare tire assembly of FIG. 9, taken along the lines 10-10. As seen in FIGS. 9 and 10, guard 56 is laid flat on central portion 32 of wheel 30. Chain 42 and coupling member 46 have been passed through central aperture 62 of guard 56 (see also FIG. 8). Coupling member 46 has also been passed through central aperture 36 of wheel 30 and is now engaged with the underside of central portion 32 of wheel so that spare tire 22 will be lifted as hoisting device 38 pulls on chain 42. With coupling member 46 and chain 42 in this configuration, guard 56 overlays lug apertures 34. It will be seen most easily in FIG. 10 that hoisting device 38 has pulled up tire 22 toward its stowage position in recess 26 of vehicle 20 (FIG. 2). Consequently, intermediate portion 50 of chain 42 droops below hoisting device 38 and lays on top of guard 56, which is interposed between intermediate portion 50 and lug apertures 34 (FIGS. 9 and 10). Thus, intermediate portion 50 of chain 42 does not fall into apertures and jam the operation of hoisting device 38.

Figure 11:
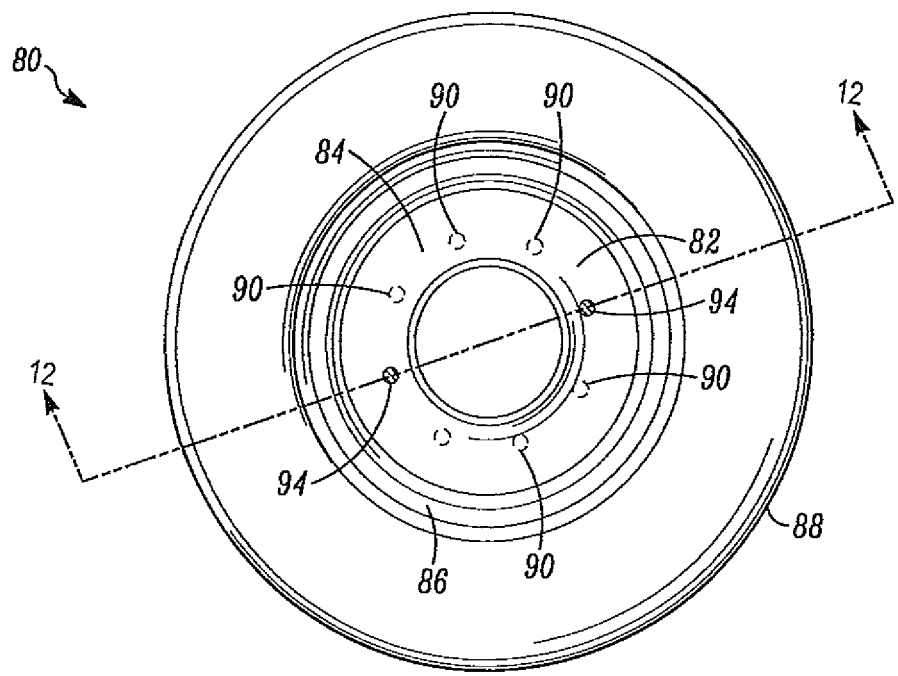
FIG. 11 is a top plan view of a spare tire assembly in accordance with a second embodiment.

FIG. 11 is a top plan view of a spare tire assembly 80 in accordance with an alternative embodiment. A guard 82 is pliable and circular with a diameter of approximately nine inches and a generally ring-shaped outer portion 84. Other sizes and shapes can be used for guard 82. Guard 82 is made of plastic but can also be made of rubber, leather or coated paper and can if desired be rigid (especially since it is not necessary to dilate the central aperture of guard) Referring to FIG. 11, guard 82 is removably placed atop a central portion 86 of a spare tire 88. In this configuration, the outer portion 84 of guard 82 overlays a plurality of lug apertures 90 that are sized and configured to received wheel studs. Guard 82 includes a central aperture 92 of a larger, fixed diameter (in this case, four inches) to permit insertion of coupling member 46 therethrough. Guard 82 does not require slits or flaps such as the slits 64 and flaps 68 of guard 56 (FIGS. 6 and 7).

Because guard 82 has a central aperture 92 of a larger diameter, slippage of guard 82 over central portion 86 of spare tire 88 may position center aperture 92 over one of lug apertures 90, thus exposing the lug aperture 90 to the chain of a hoisting device such as hoisting device 38. To prevent this, guard 82 includes locator pins 94 projecting from the underside of outer portion 84. Locator pins 94 are positioned and sized to align with one or more of lug apertures 90, so that locator pins 94 are received by corresponding lug apertures 90 to retain guard 82 in affixed position relative to spare tire 86.

Figure 12:
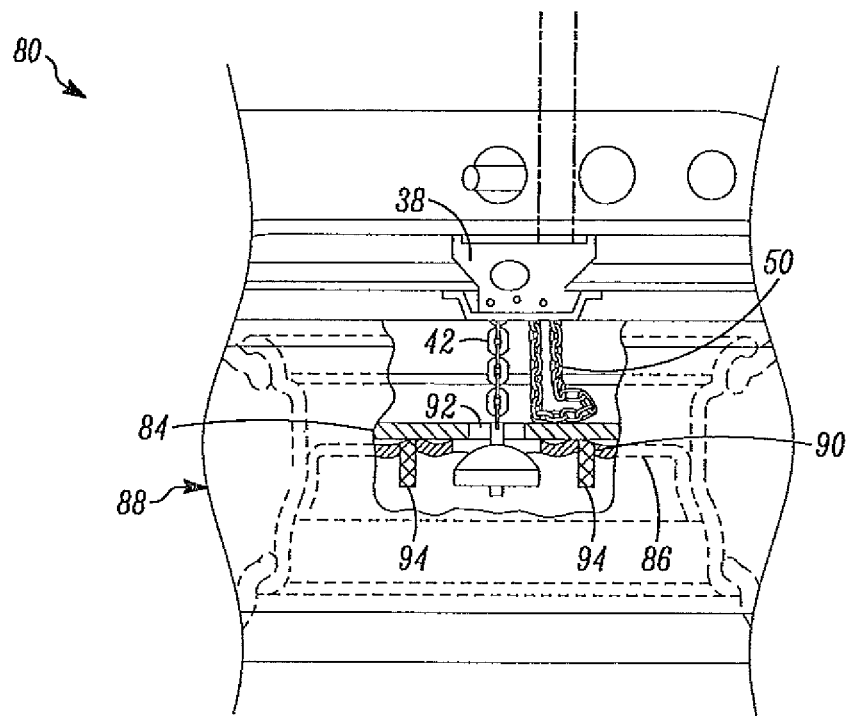
FIG. 12 is a sectional view of the spare tire assembly of FIG. 11 taken along the lines 12-12.

FIG. 12 is a sectional view of the tire assembly taken along the lines 12-12. It will be seen that locator pins 92 project downward from the underside of guard 82 and are received by corresponding lug apertures 90.

Accordingly, while the invention has been described in connection with certain embodiments, it is to be understood that the invention is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A stowage apparatus for use in a vehicle, comprising:
    a spare tire having a hub-facing central portion defining a central wheel aperture and a plurality of lug apertures;
    a hoisting device mountable to the vehicle;
    a tether having a first portion and a second portion depending from the hoisting device;
    a coupling member attached to the first portion of the tether and configured to releasably attach the tether to the hub-facing central portion of the spare tire; and
    a removable guard including an outer portion with a moveable portion defining and surrounding a central aperture, the removable guard positioned such that the central aperture is concentric with the central wheel aperture and the outer portion at least partially covers each of the plurality of lug apertures to prevent the second portion of the tether from entering any of the plurality of lug apertures when the hoisting device raises the spare tire, the movable portion being movable between a flat configuration in which the central aperture has the first size that is too small to permit passage of the coupling member, and an outwardly extended configuration in which the central aperture has the second size that permits passage of the coupling member.

2. The apparatus of claim 1, wherein the moveable portion includes a plurality of flaps, and wherein the plurality of flaps can be moved to change the size of the central aperture between the first size and the second size.

3. The apparatus of claim 2, wherein each of the flaps terminates in an arcuate distal end so that when the flaps lay flat, their distal ends define a circular opening concentric with the central aperture and having a diameter of the first size.

4. The apparatus of claim 1, wherein the movable portion comprises a plurality of inwardly radially projecting flaps arranged about a circumference of the central aperture, each having a length that is less than the radius of the central aperture so that, when the flaps lay flat in coplanar relation to the outer portion, they obstruct in part the central aperture, reducing the central aperture to the first size.

5. The apparatus of claim 4, wherein each of the flaps terminates in an arcuate distal end so that when the flaps lay flat, their distal ends define a circular opening concentric with the central aperture and having a diameter of the first size.

6. The apparatus of claim 1, wherein the outer portion includes at least one slit projecting radially from the central aperture.

7. The apparatus of claim 6, wherein the at least one slit extends to a periphery of the outer portion.

8. The apparatus of claim 6, wherein the outer portion has a plurality of slits projecting radially from the central aperture to define therebetween movable flaps.

9. The apparatus of claim 1, wherein the removable guard includes an upper surface opposing the hub-facing central portion and at least one locator pin extending opposite the upper surface, the locator pin received by a corresponding lug aperture when the removable guard overlays the hub-facing wheel portion and the spare tire is substantially horizontal.

10. The apparatus of claim 1, wherein the removable guard is pliable.

11. The apparatus of claim 1, wherein the removable guard is positioned between the hub-facing central portion and an underside of the vehicle.

12. The apparatus of claim 1, wherein the removable guard is positioned between the hub-facing central portion and the second portion of the tether.

13. A method for stowing a spare tire having a hub-facing central portion defining a central wheel aperture and a plurality of lug apertures, using hoisting device mounted to a vehicle, the hoisting device including a tether having a first portion attached to a coupling member and a second portion depending therefrom, the method comprising:

- overlaying the hub-facing central portion with a removable guard, such that an outer portion of the removable guard at least partially covers each of the plurality of lug apertures and a central aperture of the removable guard defined and surrounded by a movable portion of the outer portion is concentric with the central wheel aperture;
- expanding the central aperture from a first size that is too small to permit passage of the coupling member to a second size that permits passage of the coupling member by moving the moveable portion of the outer portion from a flat configuration to an outwardly extending configuration;
- inserting the first end of the tether and the coupling member through the expanded central aperture and the central wheel aperture;
- contracting the central aperture from the second size to the first size by moving the moveable portion from the outwardly extending configuration to the flat configuration;
- coupling the coupling member to the hub-facing central portion; and
- actuating the hoisting device to hoist the spare tire into a stowage position.

14. An apparatus for stowing a spare tire having a hub-facing wheel portion with a plurality of lug apertures, comprising:

- a hoisting device mountable to the underside of a vehicle;
- a tether having a first portion and a second portion coupled to the hoisting device so that the first and second portions of the tether depend from the hoisting device when it is mounted to the underside of a vehicle;
- a coupling member attached to the first portion of the tether and configured to releasably attach the tether to the hub-facing wheel portion of the spare tire when the spare tire is substantially horizontal; and
- a removable guard comprising an outer portion surrounding a central aperture, with the outer portion sized and configured to lay over at least part of the hub-facing wheel portion to at least partially cover at least one of the plurality of lug apertures such that the second portion of the tether cannot enter the at least one of the plurality of lug apertures when the hoisting device raises the spare tire, and the central aperture sized and configured to permit the passage therethrough of the coupling member and the tether, wherein:
  - the central aperture can expand from a first size that is too small to permit passage of the coupling member to at least a second size that permits passage of the coupling member, and
  - the removable guard further comprises a plurality of inwardly radially projecting flaps arranged about a circumference of the central aperture, each having a length that is less than the radius of the central aperture so that, when the flaps lay flat in coplanar relation to the outer portion, they obstruct in part the central aperture, reducing the central aperture to the first size.

15. The apparatus of claim 14, wherein each of the flaps terminates in an arcuate distal end so that when the flaps lay flat, their distal ends define a circular opening concentric with the central aperture and having a diameter of the first size.

16. The apparatus of claim 14, wherein the outer portion includes at least one slit projecting radially from the central aperture.

17. The apparatus of claim 16, wherein the at least one slit extends to a periphery of the outer portion.

18. The apparatus of claim 16, wherein the outer portion has a plurality of slits projecting radially from the central aperture to define the flaps therebetween.

* * * * *